(12) United States Patent
Takemoto et al.

(10) Patent No.: US 7,961,418 B2
(45) Date of Patent: Jun. 14, 2011

(54) RESISTIVITY SENSE BIAS CIRCUITS AND METHODS OF OPERATING THE SAME

(75) Inventors: Naoko Takemoto, Kanagawa (JP); Motomu Hashizume, Tokyo (JP)

(73) Assignee: Texas Instruments Incorporated, Dallas, TX (US)

( * ) Notice: Subject to any disclaimer, the term of this patent is extended or adjusted under 35 U.S.C. 154(b) by 1064 days.

(21) Appl. No.: 11/747,681

(22) Filed: May 11, 2007

(65) Prior Publication Data
US 2008/0278859 A1 Nov. 13, 2008

Related U.S. Application Data

(60) Provisional application No. 60/917,058, filed on May 9, 2007, provisional application No. 60/917,319, filed on May 10, 2007.

(51) Int. Cl.
*G11B 5/03* (2006.01)
(52) U.S. Cl. ............... 360/66; 360/46; 360/67; 360/68
(58) Field of Classification Search .................. None
See application file for complete search history.

(56) References Cited

U.S. PATENT DOCUMENTS

| | | | |
|---|---|---|---|
| 6,054,901 A | 4/2000 | Nainar et al. | |
| 6,067,200 A * | 5/2000 | Ohba et al. | 360/66 |
| 6,134,060 A * | 10/2000 | Ryat | 360/46 |
| 6,252,735 B1 * | 6/2001 | Chung et al. | 360/67 |
| 6,341,046 B1 * | 1/2002 | Peterson | 360/67 |
| 6,462,600 B2 * | 10/2002 | Pakriswamy | 327/307 |
| 6,512,648 B1 * | 1/2003 | Tsuchiya et al. | 360/66 |
| 6,532,127 B1 * | 3/2003 | Ranmuthu et al. | 360/66 |
| 6,606,212 B1 * | 8/2003 | Klaassen et al. | 360/67 |
| 6,847,501 B2 * | 1/2005 | Cheung et al. | 360/46 |
| 6,947,238 B2 * | 9/2005 | Takayoshi et al. | 360/66 |
| 7,130,143 B1 * | 10/2006 | Tretter | 360/66 |
| 7,692,887 B2 * | 4/2010 | Dolan et al. | 360/31 |
| 2003/0227704 A1 | 12/2003 | Takayoshi et al. | |
| 2005/0141119 A1 * | 6/2005 | Takeuchi et al. | 360/66 |
| 2006/0152838 A1 * | 7/2006 | Fitzgerald et al. | 360/46 |

FOREIGN PATENT DOCUMENTS

JP 2003317201 11/2003

* cited by examiner

*Primary Examiner* — Dismery E Mercedes
(74) *Attorney, Agent, or Firm* — Dawn V. Stephens; Wade James Brady, III; Frederick J. Telecky, Jr.

(57) ABSTRACT

Resistivity sense bias circuits are described herein. An example resistivity sense bias circuit for use with a magnetoresistive read head includes a current biasing portion configured to provide a bias current across the magnetoresistive read head thereby establishing a bias voltage across the magnetoresistive read head, a resistivity sensing portion coupled to the current biasing portion and configured to sense a change in the bias current based on a resistivity change of the magnetoresistive read head, and a voltage source to provide the bias voltage and to adjust the bias voltage in response to the resistivity change of the magnetoresistive read head.

7 Claims, 3 Drawing Sheets

RESISTIVITY SENSE BIAS CIRCUITS AND METHODS OF OPERATING THE SAME

RELATED APPLICATIONS

This patent claims priority from U.S. Patent Application No. 60/917,058, entitled "Resistivity Sense Bias Circuits and Methods of Operating the Same", which was filed on May 9, 2007, and U.S. Patent Application No. 60/917,319, entitled "Resistivity Sense Bias Circuits and Methods of Operating the Same", which was filed on May 10, 2007. U.S. Patent Application Nos. 60/917,058 and 60/917,319, are hereby incorporated by reference in their entirety.

FIELD OF THE DISCLOSURE

This disclosure relates generally to bias circuits and, more particularly, to methods and apparatus to provide resistivity sense bias circuits and methods of operating the same.

BACKGROUND

The magnetic recording industry has increased the performance and capacity of hard disk drives to meet the demands of the computer industry for more and better storage. Applications such as multimedia, real-time audio and video, graphical user interfaces and increasing program sizes are driving this increase. Hard disk areal density storage capacity historically increased at an average yearly growth rate of approximately 25 percent. Sustaining this growth in capacity has required progressive advances in many technologies used to provide a hard disk drive.

Historically, read-write head technology was based on the inductive voltage produced when a permanently magnetized area on a rotating disk moved past a head employing a wire-wrapped magnetic core. Increasing areal density requirements drove a steady progression of inductive recording head advances, which led to advanced thin-film inductive read-write heads.

The inductive head is frequently expected to alternatively perform the conflicting tasks of writing data onto the disk and reading previously-written data. In other implementations, the write and read functions are separated into two physically distinct heads. This allows using an inductive head that is optimized for writing data and a magnetoresistive head structure that is optimized for reading data. In such an apparatus, the magnetoresistive read head includes of a read element that is sandwiched between two highly-permeable magnetic shields. The shields assist in focusing the magnetic energy from the disk and rejecting stray fields. The magnetoresistive read element is made from a ferromagnetic alloy whose resistance changes as a function of an applied magnetic field. In a hard disk drive, this magnetic field is derived from the magnetized regions placed on the rotating disk by the write head and is used to modulate the resistivity of the magnetoresistive read element during a read operation.

A schematic diagram of an example prior art implementation of a voltage biasing circuit for biasing a magnetoresistive read element RMR is illustrated in FIG. 1. The example implementation provides a voltage defined bias. In other words, the circuit provides a set voltage and sources a current based on the resistance of the magnetoresistive read element RMR. The circuit outputs a differential voltage Vdiff that corresponds to the high frequency variation of the resistivity of the magnetoresistive read head RMR caused by the magnetized regions of a hard disk.

The example circuit of FIG. 1 includes a voltage source Vsource, an impedance Rp, a current source Idac, a impedance Rc1, a impedance Rc2, a transistor T1, a transistor T2, a current source Itail1, a current source Itail2, a magnetoresistive read head RMR, a transistor M1, a transistor M2, a transistor M3, a transistor M4, a capacitor C1, and an opamp OP1.

The voltage source Vsource, the impedance Rp, and the current source Idac provide a set bias voltage to the transistor T1 and the transistor T2. The bias voltage allows current to flow from a positive supply voltage Vdd through the impedance Rc1 and the impedance Rc2 and through the transistor T1 and the transistor T2 respectively. When, the transistor M1 and the transistor M3 are not biased, some of the current flowing through the impedance Rc1 flows through the magnetoresistive read head RMR. The current source Itail1 is set to source the amount of current flowing through the impedance Rc1 minus the amount of current flowing through the magnetoresistive read head RMR. The current source Itail2 is set to source the amount of current flowing through the impedance Rc2 plus the amount of current flowing through the magnetoresistive read head RMR.

When the transistor M1 and the transistor M3 are not biased on, but the impedance of the magnetoresistive read head RMR changes (e.g., due to subjecting the magnetoresistive read head RMR to a magnetic field), the amount of current flowing through the magnetoresistive read head RMR changes. The change in current causes the current flowing through the impedance Rc1 to increase by the amount of the change (e.g., an increase if the current flowing through the magnetoresistive read head increases and a decrease if the current flowing through the magnetoresistive read head decreases). The change in current develops a voltage potential between a first node between the impedance Rc1 and the transistor T1 and a second node between the impedance Rc2 and the transistor T2 (voltage differential Vdiff).

The voltage differential Vdiff between the first node and the second node is connected to the opamp OP1. The opamp OP1 outputs a voltage proportional to the difference between the inputs. The voltage from the opamp OP1 causes the transistor M3 to be biased on, which sinks current from the magnetoresistive read head RMR. The voltage from the opamp OP1 also biases the transistor M4, which causes a gate of the transistor M2 and a gate of the transistor M1 to be tied to ground. The transistor M1 is biased into operation, which allows current to flow through the transistor M1 and into the magnetoresistive read head RMR. Accordingly, the transistors M1 to M3 respectively source and sink current through the magnetoresistive read head RMR such that the current flowing through impedance Rc1 and impedance Rc2 is unaffected by a variation in the resistance of the magnetoresistive read head RMR. The capacitor C1 sinks high frequency signals from the opamp OP1 to ground. Therefore, the opamp OP1 only controls for resistivity variation at low frequencies, which allows the high frequency variations (e.g., variation due to the difference between natural resistivities of magnetoresistive read heads) caused by the magnetoresistive read head RMR passing over magnetized regions of a hard disk to be detectable at the output Vdiff.

DETAILED DESCRIPTION

Figure 2:
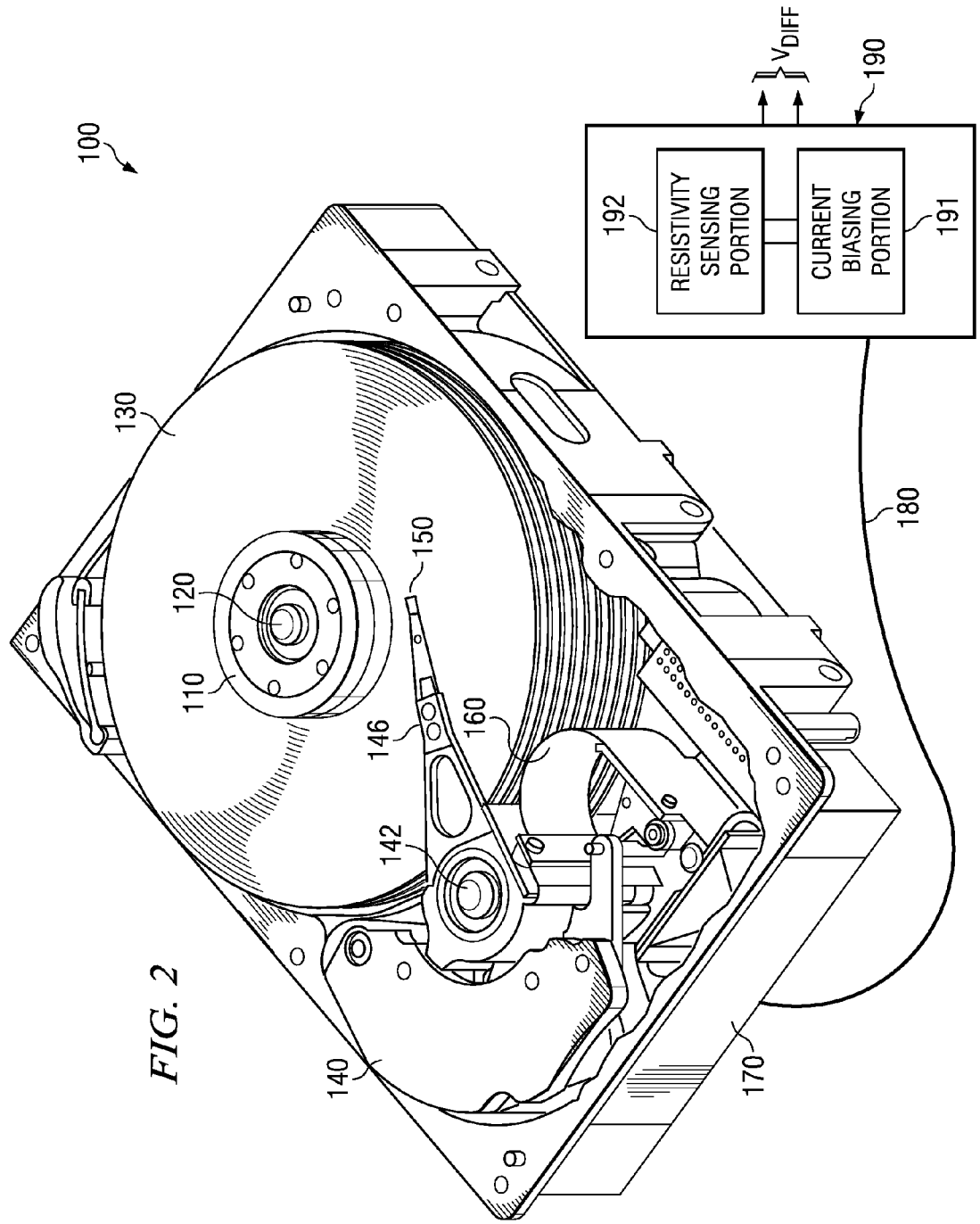
FIG. 2 is a system diagram of an example hard disk drive system constructed in accordance with the teaching of the present invention.

FIG. 2 is a system diagram of an example hard disk drive system 100 constructed in accordance with the teachings of the present invention. The example hard disk drive 100 of FIG. 2 includes a motor 110, a drive spindle 120, a storage medium 130, an actuator 140 employing an actuator arm 146 mounted on an actuator axis 142, a read-write head assembly 150, an interconnect cable 160, a housing 170, a coupling cable 180 and a resistivity sense bias circuit 190. The read-write head assembly 150 of the illustrated example includes a magnetoresistive read head 150R and a separate write head 150W (which are not individually shown in FIG. 2) proximate the storage medium 130. The resistivity sense bias circuit 190 is coupled to the magnetoresistive read head 150R via the coupling cable 180 and includes a current biasing portion 191 and a resistivity sensing portion 192 that provides a differential voltage VDIFF.

In the illustrated example, the hard disk drive 100 provides data storage, which may be employed by a processing or formatting system such as a computer. The motor 110 rotates the storage medium 130 on the spindle 120. The rotation of the spindle 120 is controlled by a feedback control circuit to ensure a substantially constant speed. The actuator 140 is a mechanical device that controls movement of the actuator arm 146 around the actuator axis 142. The actuator arm 146 is a mechanical arm that supports and extends the read-write head assembly 150 over and in-between the storage medium 130. The actuator 140 moves the read-write head assembly 150 to read and/or write data associated with designated sectors and tracks on the storage medium 130. The write head 150W writes the data onto the storage medium 130 as magnetized regions. The state of the magnetized region uniquely represents the data. These magnetized regions provide stored magnetic fields (each having one of two polarities to represent a digital 1 or 0) on the storage medium 130.

The magnetoresistive read head 150R responds to these stored magnetic fields on the storage medium 130, more specifically, resistivity of the magnetoresistive read head 150R changes depending on the characteristics of the stored magnetic fields. In the illustrated example, the current biasing portion 191 of the resistivity sense bias circuit 190 provides a bias current across the magnetoresistive read head 150R thereby establishing a bias voltage across the magnetoresistive read head 150R. Additionally, the resistivity sensing portion 192, which is coupled to the current biasing portion 191, senses a change in the bias current based on a resistivity change of the magnetoresistive read head 150R. This change in the bias current results in the differential voltage VDIFF, which is proportional to the bias current change.

The current biasing portion 191 of the illustrated example operates as a current source for the magnetoresistive read head 150R. In the example of FIG. 2, the current biasing portion 191 provides a substantially constant bias current to the magnetoresistive read head 150R while controlling the bias voltage to compensate for any low frequency current variations caused by the difference in resistivity of various magnetoresistive read heads. The current source of the illustrated example is a low impedance source. Use of a low impedance biasing current source also allows rapid biasing (i.e., bias turn-on) of the magnetoresistive read head 150R as an additional advantage over prior art constant current biasing. Additionally, impedance values may be selected or tuned by adjusting the bias current passing through the magnetoresistive read head 150R. Improved bandwidth and response times typically also occur due to lower impedances and capacitances associated with the low impedance biasing current source arrangement.

Figure 3:
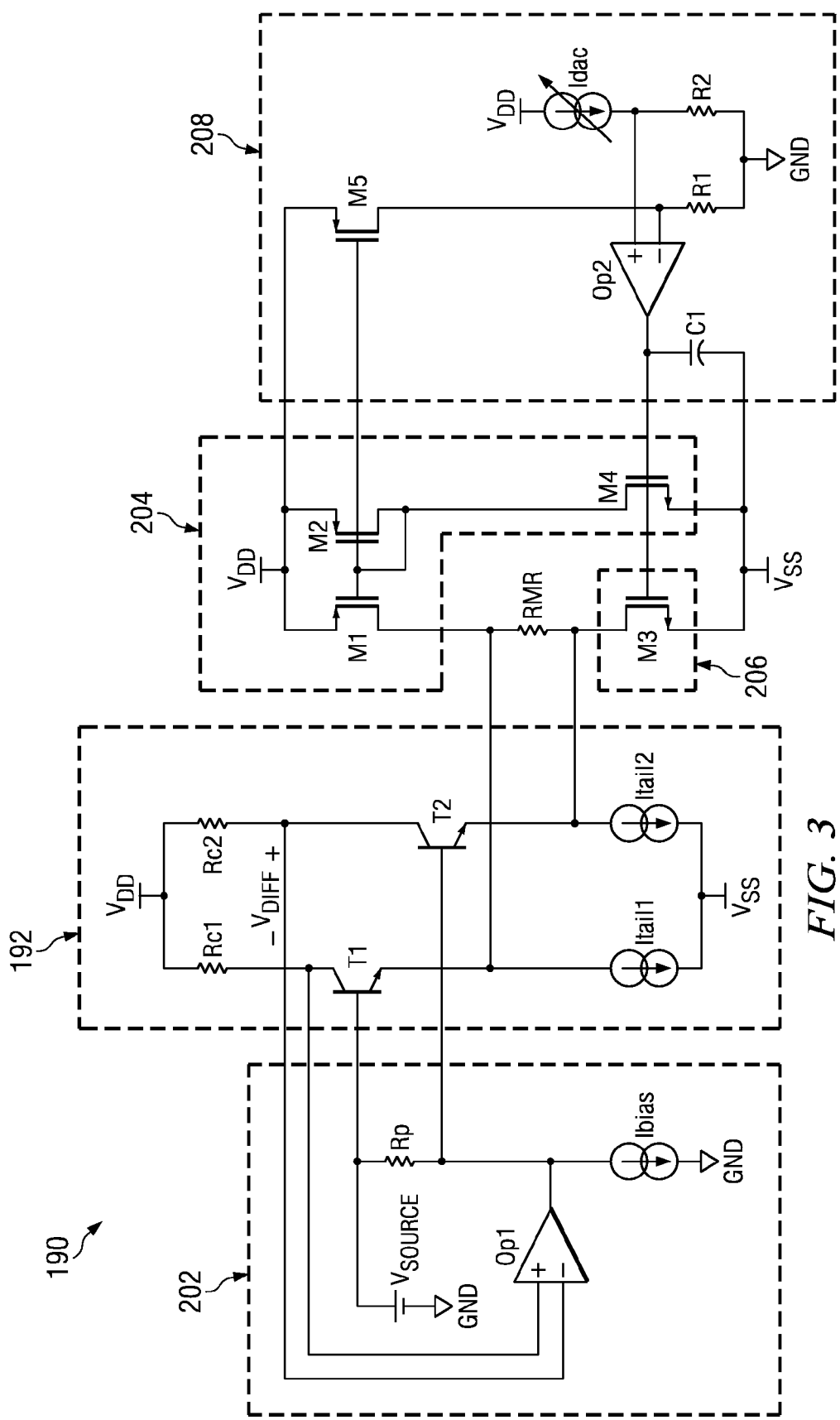
FIG. 3 is a schematic diagram of an example implementation of the example resistivity sense bias circuit of FIG. 2.

FIG. 3 is a schematic diagram of an example implementation of the resistivity sense bias circuit 190 of FIG. 2. The example resistivity sense bias circuit 190 includes a controlled bias voltage source 202, the resistivity sensing portion 192, a current source 204, a current sink 206, and a controller 208.

The example controlled bias voltage source 202 includes a voltage source Vsource, an impedance Rp, an operational amplifier (opamp) Op1, and a current source Ibias.

The example voltage source Vsource has a negative terminal connected to ground potential and a positive terminal connected to an impedance Rp and a base of a transistor T1, which is described in further detail in conjunction with the resistivity sensing portion 192. A second end of the impedance Rp is connected to a base of a transistor T2 (which is described in further detail in conjunction with the resistivity sensing portion 192), to the output of the opamp OP1, and to the current source Ibias. The opamp OP1 includes a positive terminal that is connected to a negative node of a voltage differential Vdiff and a negative terminal that is connected to a positive node of the voltage differential Vdiff. The voltage source Vsource together with the impedance Rp provide a bias voltage between the transistors T1 and T2. The bias voltage is adjusted by the output of the opamp OP1. Specifically, the opamp OP1 causes an increase in the bias voltage when the resistivity of the magnetoresistive read head RMR increases causing Vdiff to be a negative voltage and causes a decrease in the bias voltage when the resistivity of the magnetoresistive read head RMR decreases causing Vdiff to be a positive voltage. In other words, the opamp OP1 controls the bias voltage to cause Vdiff to have a substantially negligible DC bias.

The example resistivity sensing portion 192 includes the transistor T1, the transistor T2, an impedance Rc1, an impedance Rc2, a current source Itail1, and a current source Itail2.

The impedance Rc1 of the illustrated example is interconnected between a positive supply voltage Vdd and a source of the transistor T1. The impedance Rc2 is interconnected between the positive supply voltage Vdd and a source of the transistor T2. The source of the transistor T2 defines the positive side of the differential voltage Vdiff. The source of the transistor T1 defines the negative side of the differential voltage Vdiff. An emitter of the transistor T1 is connected to a first side of the magnetoresistive read head impedance RMR and to a negative side of the current source Itail1. An emitter of the transistor T2 is connected to a second side of the magnetoresistive read head impedance RMR and to a negative side of the current source Itail2. A positive side of the current source Itail1 is connected to a negative supply voltage Vss. A positive side of the current source Itail2 is connected to the negative supply voltage Vss.

The illustrated example employs NPN bipolar junction transistors for the transistors T1 and T2. However, it should be understood that it is well within the scope of the present invention for the resistivity sense bias circuit 190 to employ other transistor types. For example, this may include PNP bipolar junction transistors, metal oxide semiconductor (MOS) transistors or junction gate field effect transistors (JFET) devices, as well as other appropriate future-developed devices.

In the example implementation, the current source Itail1 is set to provide a current approximately equal to an amount of current that flows through impedance Rc1 minus an amount of current that flows through the magnetoresistive read head RMR (i.e., a current equal to voltage bias divided by the estimated resistivity of the magnetoresistive read head RMR). The example current source Itail2 is set to provide a current approximately equal to an amount of current that flows through impedance Rc2 plus the amount of current that flows through the magnetoresistive read head RMR. If the magnetoresistive read head RMR has a resistivity different from the estimated resistivity, the amount of current that flows through impedance Rc1 will not equal the amount of current that flows through impedance Rc2. If the difference is present at low frequency (e.g., due to the magnetoresistive read head having a different resistivity than the estimated resistivity even when a magnetic field is not present), the difference will be compensated by the controlled bias voltage source 202 as described above. If the difference is due to a high frequency change (i.e., a change due to the magnetoresistive read head RMR passing over a magnetized region of a hard drive), the difference will not be compensated by the controlled bias voltage source 202 and will be detectable at Vdiff. For example, a circuitry for reading the changes caused by the magnetized regions of a hard disk may be attached to Vdiff to read the variations of Vdiff.

The magnetoresistive read head impedance RMR of the illustrated example corresponds to the impedance of the magnetoresistive read head 150R described in conjunction with FIG. 2. The current source 204, the current sink 206, and the controller 208 described below set up a bias current for the magnetoresistive read head impedance RMR. As the magnetoresistive read head 150R experiences magnetic field excitation (e.g., during operation of the hard disk drive 100 of FIG. 2), the resistivity of the magnetoresistive read head changes. For a constant current, the change in resistivity causes a change in the voltage drop across the magnetoresistive read head 150R. As described in conjunction with FIG. 2, this change in the voltage drop provides the differential voltage Vdiff, which is proportional to the change in the bias voltage of the magnetoresistive read head 150R.

The current source 204, the current sink 206, and the controller 208 implement the current biasing portion 191 of FIG. 2. The current source 204, the current sink 206, and the controller 208 provide a constant current set by a current source Idac to the magnetoresistive read head RMR.

The current source 204 of the illustrated example comprises a transistor M1, a transistor M2, and a transistor M4. The transistor M1 includes a source connected to a first side of the magnetoresistive read head impedance RMR, a drain connected to the positive supply voltage Vdd, a source of the transistor M2, a drain of the transistor M4, and a gate connected to a gate of the transistor M2 and the controller 208. The diode connected transistor M2 includes a drain connected to the positive supply voltage Vdd. The transistor M4 includes a base connected to the controller 208 and the current sink 206 and a source connected to the negative supply voltage Vss. When the base of the transistor M4 is biased by the controller 208, the base of the transistor M1 and the transistor M2 are connected to the negative supply voltage Vss causing current to flow from the positive supply voltage Vdd through the transistor M1 to the magnetoresistive read head RMR. As will be described in further detail below, biasing the base of the transistor M4 also enables a current equivalent to the current flowing through the transistor M1 to flow into the controller 208.

The current sink 206 of the illustrated example comprises a transistor M3. The transistor M3 includes a drain connected to a second side of the magnetoresistive read head RMR, a base connected to the current source 204, and a source connected to the negative supply voltage Vss. The transistor M3 sinks current from the magnetoresistive read head RMR to the negative supply voltage Vss when the base of the transistor M3 is biased by the controller 208.

The controller 208 of the illustrated example comprises a transistor M5, a current source Idac, an impedance R1, an impedance R2, an opamp OP2, and a capacitor C1.

The transistor M5 includes a gate connected to the current source 204, a drain connected to the positive supply voltage Vdd, and a source connected to the inverting input of the opamp OP2 and the impedance R1. The impedance R1 is interconnected between the inverting input of the opamp OP2 and the negative supply voltage Vss. The impedance R2 is interconnected between the non-inverting input of the opamp OP2 and the negative supply voltage Vss. The current source Idac is interconnected between the positive supply voltage Vdd and the non-inverting input of the opamp OP2.

The current source Idac supplies a set current through the impedance R2. The opamp OP2 outputs a current signal proportional to the difference between the voltage from the current flowing from transistor M5 through the resistor R1 and the voltage from the current from current source Idac through resistor R2. As the current from the transistor M5 increases, the voltage potential at the inverting input of the opamp OP2 increases. The increase in the voltage potential at the inverting input of the opamp OP2 reduces the difference between the voltage at the positive input and the voltage at the negative input. The reduction in the voltage difference causes a reduction in the signal output by the opamp OP2, which is proportional to the difference between the positive input and the negative input of the opamp Op2. Accordingly, as the signal output by the opamp OP2 decreases, the biasing of the transistor M3 is reduced, which adjusts the current supplied to the magnetoresistive read head RMR. The adjustment of the current source 204 and the current sink 206 causes a current to be supplied by the current source 204 that is collected by the current sink 206 thereby providing a substantially constant bias current to the magnetoresistive read head RMR.

The illustrated example employs N channel metal oxide semiconductor (NMOS) field effect transistors for the transistors M3, M4, and M5 and P channel NMOS field effect transistors for transistors M1 and M2. However, it should be understood that it is well within the scope of the present invention for resistivity sense bias circuit 190 to employ other transistor types. For example, this may include bipolar junction transistors or JFET devices, as well as other appropriate future-developed devices.

Figure 1:
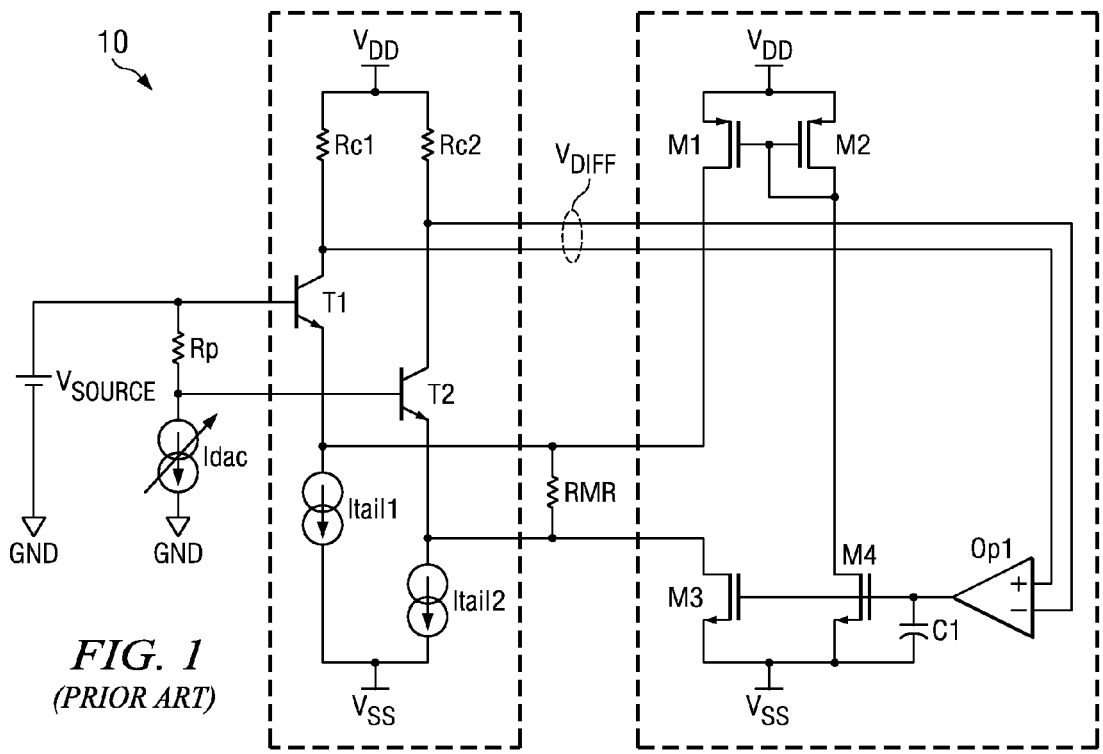
FIG. 1 is a schematic diagram of an example implementation of a resistivity sense voltage bias circuit.
Figure 4:
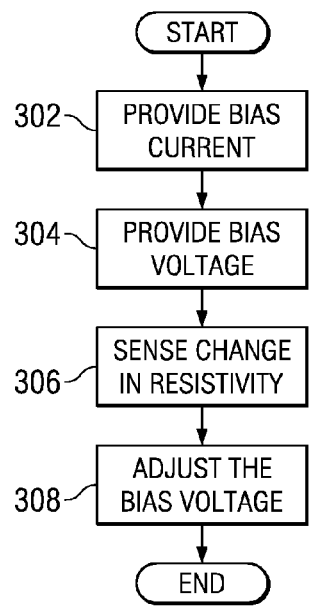
FIG. 4 is a flow diagram of an example implementation of a method to provide a resistivity sensed bias current.

FIG. 4 is a flow diagram of an example implementation of a method to provide a resistivity sense bias current. The example method begins when a bias current is supplied to a magnetoresistive head (block 302). For example, the bias current may be supplied to the magnetoresistive read head 150R of FIG. 2 represented by the magnetoresistive read head impedance RMR of FIG. 3 by the current source 204 and collected by the current sink 206 of the resistivity sense bias circuit 190 of FIG. 3. Then, a bias voltage is applied across the magnetoresistive head (block 304). For example, the bias voltage 202 supplies a voltage equal to the resistance of the magnetoresistive read head RMR multiplied by the bias current.

The magnetoresistive head may vary in resistivity. For example, the magnetoresistive head inserted in the circuit may have a different resistivity from the resistivity that the circuit is configured to use. The change in the resistivity is sensed (block 306). For example, the current biasing portion 191 monitors the current through the magnetoresistive read head RMR and senses the change. In response to sensing the change, the circuitry providing the bias current is adjusted to ensure that the DC bias of Vdiff is approximately zero (block 308). For example, controllable bias voltage source 202 will be adjusted to supply an adjusted bias voltage causing the current flowing through the magnetoresistive read head RMR to be the same as the current flowing through the magnetoresistive read head RMR in block 302.

From the foregoing, persons of ordinary skill in the art will appreciate that the above disclosed methods and apparatus may be realized within a single device or using two or more cooperating devices, and could be implemented by software, hardware, and/or firmware to implement a resistivity sense bias circuit disclosed herein.

Although certain example methods, apparatus, and articles of manufacture have been described herein, the scope of coverage of this patent is not limited thereto. On the contrary, this patent covers all methods, apparatus and articles of manufacture fairly falling within the scope of the appended claims either literally or under the doctrine of equivalents.

What is claimed is:

1. A resistivity sense bias circuit for use with a magnetoresistive read head, comprising:
    a first transistor with a first emitter coupled to a first terminal of the magnetoresistive read head;
    a second transistor with a second emitter coupled to a second terminal of the magnetoresistive read head;
    a bias source connected between the base of the first transistor and the base of the second transistor, whereby the bias source establishes a bias current through the magnetoresistive read head;
    a first resistor connected to a collector of the first transistor;
    a second resistor connected to a collector of the second transistor;
    a first current source connected to the first emitter and the first terminal of the magnetoresistive read head to provide a first current;
    a second current source connected to the second emitter and the second terminal of the magnetoresistive read head to provide a second current;
    a first operational amplifier connected to the first emitter and the second emitter to output a signal based on a difference between a voltage potential at the first emitter and a voltage potential at a second emitter; and
    wherein a total current applied to the magnetoresistive read head is equal to the difference between the first current and the second current plus the bias current,
    further comprising a resistor having a fourth current connected to an output of the first operational amplifier.

2. A resistivity sense bias circuit as defined in claim 1, further comprising a current source to provide a fifth current.

3. A resistivity sense bias circuit as defined in claim 2, wherein the current source is connected to a first input of a second operational amplifier.

4. A resistivity sense bias circuit as defined in claim 3, wherein the current source modifies the output of the second operational amplifier.

5. A resistivity sense bias circuit as defined in claim 4, further comprising a third transistor with a gate connected to the output of the second operational amplifier.

6. A resistivity sense bias circuit as defined in claim 5, wherein the third transistor has a drain connected to the second terminal of the magnetoresistive read head.

7. A resistivity sense bias circuit as defined in claim 6, wherein the first transistor and the second transistor are NPN bipolar junction transistors and the third transistor is an N channel metal oxide semiconductor field effect transistor.

* * * * *